(12) United States Patent
Sharma et al.

(10) Patent No.: US 12,501,239 B2
(45) Date of Patent: Dec. 16, 2025

(54) METHOD AND APPARATUS FOR SUPPROTING RCS AUTO-CONFIGURATION

(71) Applicant: SAMSUNG ELECTRONICS CO., LTD., Suwon-si (KR)

(72) Inventors: Himanshu Sharma, Uttar Pradesh (IN); Sakshi Bhatia, Uttar Pradesh (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 470 days.

(21) Appl. No.: 17/987,451

(22) Filed: Nov. 15, 2022

(65) Prior Publication Data
US 2024/0107277 A1    Mar. 28, 2024

Related U.S. Application Data

(63) Continuation of application No. PCT/KR2022/017410, filed on Nov. 8, 2022.

(30) Foreign Application Priority Data

Sep. 23, 2022 (IN) .............. 202211054769

(51) Int. Cl.
  *H04W 4/12* (2009.01)
  *H04W 8/18* (2009.01)
(52) U.S. Cl.
  CPC ............. *H04W 4/12* (2013.01); *H04W 8/183* (2013.01)
(58) Field of Classification Search
  None
  See application file for complete search history.

(56) References Cited

U.S. PATENT DOCUMENTS 10,298,739 B2   5/2019  Lee et al.
2007/0015538 A1*  1/2007  Wang ............... H04M 1/72406
                                       455/558

(Continued)

FOREIGN PATENT DOCUMENTS

CN      107809437       3/2018
KR   10-2016-0113833    10/2016

(Continued)

OTHER PUBLICATIONS

TTAK.KO_TTAK.KO-06.0410-R5_pub. date_ Dec. 8, 2021 (Year: 2021).*

(Continued)

*Primary Examiner* — Jinsong Hu
*Assistant Examiner* — Alexander J Yi
(74) *Attorney, Agent, or Firm* — NIXON & VANDERHYE P.C.

(57) ABSTRACT

The disclosure relates to a method for supporting rich communication service (RCS) auto-configuration failure. The method includes: monitoring a plurality of messages exchanged between a user device and a configuration server, detecting a first message received from the configuration server is a failure message, extracting a timer from header of the failure message and a rate limiting factor of service provider from one or more databases, setting an alarm in the user device for sending a second message to the configuration server, storing configuration information including the timer and the rate limiting factor into a SIM memory, retrieving the stored configuration information from the SIM memory with reference to a requesting mode, and configuring the user device to send a third message to the configuration server based on the retrieved configuration information.

14 Claims, 8 Drawing Sheets

(56) References Cited

U.S. PATENT DOCUMENTS

| | | |
|---|---|---|
| 2012/0196655 A1 | 8/2012 | Fischer |
| 2018/0152349 A1 | 5/2018 | Banerjee |
| 2018/0183655 A1 | 6/2018 | Gupta et al. |
| 2020/0119984 A1 | 4/2020 | Bouvet et al. |
| 2021/0258857 A1 | 8/2021 | Won |

FOREIGN PATENT DOCUMENTS

| | | |
|---|---|---|
| KR | 10-2021-0003576 | 1/2021 |
| KR | 10-2022-0076624 | 6/2022 |
| WO | 2018/125529 | 7/2018 |

OTHER PUBLICATIONS

RCC.07_RCC.07-v8.0_pub. date_ Jun. 28, 2017 (Year: 2017).*
Search Report and Written Opinion dated Jun. 8, 2023 issued in International Patent Application No. PCT/KR2022/017410.
TTA, "Interoperability between User Equipment and Mobile Network Operator for RCS Service", TTAK.KO-06.0410/R5, dated Dec. 8, 2021, 176 pages.
Extended European Search Report for EP Application No. 22959630.9 dated Jun. 26, 2025, 10 pages.
Van Pelt Tom, "Rich Communication Suite 5.1, Endorsement of 3GPP TS 29.311 Service level Interworking for Messaging Services" Version 1.0, August 13, 2012, XP 093045905, 25 pages.
T3, "CR 31.102 Rel-4 Introduction of MMS files and procedures" 3GPP T3 Meeting #22, Change Request, T3-020147, Marbella, Spain, Jan. 22-25, 2002, 15 pages.

* cited by examiner

METHOD AND APPARATUS FOR SUPPROTING RCS AUTO-CONFIGURATION

CROSS-REFERENCE TO RELATED APPLICATIONS

This application is a PCT-Bypass Continuation of International Application No. PCT/KR2022/017410 designating the United States, filed on Nov. 8, 2022, in the Korean Intellectual Property Receiving Office and claiming priority to Indian Patent Application No. 202211054769 (CS), filed on Sep. 23, 2022, in the Indian Patent Office, the disclosures of which are incorporated by reference herein in their entireties.

BACKGROUND

Field

The disclosure relates in general to an auto-configuration of rich communication service (RCS) and, for example, to a method and system for avoiding the RCS auto-configuration failure and preventing/reducing subscriber identity module (SIM) black-listing from configuration server.

Description of Related Art

Text messaging is a form of communication that connects billions of people and thousands of businesses every day. The Text messaging originally referred to messages sent using Short Message Service (SMS). The SMS is an essential mode of exchanging information compared to phone calls. However, the SMS has some limitations, such as fixed-character limit of the message, inability to provide services such as phonebook polling for service discovery and transmitting in-call multimedia, which necessitated development of new communication protocol rich communications services (RCS). RCS is a Global System for Mobile Communication Association (GSMA) standard that enables a user to share more forms of data than just text messages, including images, videos, location information, pdf files, and word documents, with a size limit in megabytes rather than kilobytes, as well as perform live voice or video call sessions with multi-media support, all over a data network. The RCS also allows the user to create groups to chat with friends, send images and videos, get read receipts, and supports end-to-end encryption. Further, the RCS enables the user to complete transactions within a messaging app.

RCS is a type of text-based protocol for mobile devices that is designed as a replacement for the SMS and MMS modes of messaging. Since the RCS is more reliable, secure, and provides better features and functionality, therefore used by all messaging apps and call apps, for example, Samsung Message, Android Message, Call, etc.

RCS is better than freely available over-the-top technology (OTT) messaging apps as the RCS is preinstalled, has features like pre-call, in-call, post-call, and chat bots, which are backed by an operator. Further, developers of these OTT messaging apps have to deal with variations in APIs, capabilities, and tooling to support users across such a crowded messaging ecosystem, which is difficult, time-consuming, and costly. The RCS messaging handles all these functionalities on its own, without changing software. This creates a universal profile for users.

The RCS process generally requires auto-configuration, capability exchange, and registration. The auto-configuration is a mechanism by which a user device retrieves RCS configuration from a configuration server and configures itself for RCS operation. RCS auto-configuration is highly dependent on the user device, RCS stack implementation, and network operator requirements. The user device communicates with the configuration server in HTTP (non-secured protocol) and HTTPS (secured protocol). The auto-configuration is a four-step negotiation process. The first two steps are only to determine availability of the configuration server, and the auto-configuration process generally occurs in last two steps. However, on multiple occasions, the auto-configuration fails due to server error, which causes non-registration of the user device and sometimes SIM gets blacklisted from the configuration server. The blacklisting of the SIM generally occurs due to sending auto-configuration requests multiple times from the SIM using some different devices or from secondary devices like gears, smartwatches etc. This makes the RCS non-operational and the user does not know how to configure the RCS and approaches both operator and phone customer support, which is a time-consuming and irritating approach. The RCS auto-configuration failure conditions occur on multiple occasions, such as the SIM changes to a different device, SIM/Phone Reset leading to RESET of last response from the server, Firmware update leading to RESET of the last response from the configuration server, and control of RCS activities from the secondary device, etc.

At present, there exist numerous prior arts that disclose about detecting failure events due to activity performed by the SIM.

The existing prior art discloses a radio frequency sharing in multi-subscription wireless communication device. The art further discloses systems and methods of managing communications for a wireless communication device having a first Subscriber Identity Module (SIM) associated with a first subscription and a second SIM associated with a second subscription. The method includes attempting a first activity by the first SIM with respect to a first network. The method further includes detecting a failure event of the first activity with respect to the first network and identifying a time duration until performance of a reattempt of the first activity. The method further includes determining whether the identified time duration is greater than a threshold value, and upon determining that the identified time duration is greater than the threshold value, performing a second activity by the second SIM with respect to a second network. However, the prior art does not disclose about method and system for avoiding auto-configuration failure for the RCS services. In addition, the art is silent on preventing/reducing blacklisting of the SIM from the configuration server and providing uninterrupted RCS services.

Further, the existing prior art discloses methods, apparatuses, and computer program products for managing a devices network capabilities in private networks. The prior art discloses an approach for managing network capabilities for a user equipment (UE). In an embodiment, the UE maintains subscriber data that comprises an entry index of networks for which various access modes are enabled/disabled, and a counter for each network/access mode combination. After requesting access to a network, the UE may receive a non-integrity protected rejection message that indicates the network does not allow a particular access mode. Based on cause of access rejection, the UE disallows the particular access mode for the network, starts a timer, and increments a counter associated with the network/access mode combination. Once the timer expires, if the counter value is below a threshold the UE re-enables the particular access mode for the network, or if the counter value is at or above the threshold, the UE removes the respective entry index for the particular access mode for the network. However, the prior art does not disclose about method and system for avoiding auto-configuration failure for the RCS services. In addition, the art is silent on preventing/reducing black-listing of the SIM from the configuration server and providing uninterrupted RCS services In light of the foregoing discussion, there exists a need to address the aforementioned drawbacks associated with the existing method and system for avoiding the RCS auto-configuration failure and preventing/reducing SIM black-listing from configuration server.

SUMMARY

Embodiments of the disclosure provide a method for avoiding rich communication service (RCS) auto-configuration failure and preventing/reducing subscriber identity module (SIM) black listing from a configuration server.

According to various example embodiments of the disclosure, a method for supporting RCS auto-configuration is provided. The method may comprise monitoring a plurality of messages exchanged between a user device and a configuration server. The method may comprise detecting that a first message received from the configuration server is a failure message for completing auto-configuration. The method may comprise obtaining a timer from a header of the failure message and a rate limiting factor of service provider from one or more databases. The method may comprise setting an alarm in the user device, based on the obtained timer, for sending a second message to the configuration server. The method may comprise storing configuration information in a SIM memory, wherein the configuration information includes the timer and the rate limiting factor. The method may comprise retrieving the stored configuration information from the SIM memory in a requesting mode. The method may comprise configuring the user device to send a third message to the configuration server based on the retrieved configuration information.

According to various example embodiments of the disclosure, an electronic device for supporting RCS auto-configuration is provided. The electronic device may comprise a memory storing instructions; and at least one processor, when executing the instructions, configured to perform operations. The operations may comprise monitoring a plurality of messages exchanged between a user device and a configuration server. The operations may comprise detecting that a first message received from the configuration server is a failure message for completing auto-configuration. The operations may comprise obtaining a timer from a header of the failure message and a rate limiting factor of service provider from one or more databases. The operations may comprise setting an alarm in the user device, based on the obtained timer, for sending a second message to the configuration server. The operations may comprise storing configuration information in a SIM memory, wherein the configuration information includes the timer and the rate limiting factor. The operations may comprise retrieving the stored configuration information from the SIM memory in a requesting mode. The operations may comprise configuring the user device to send a third message to the configuration server based on the retrieved configuration information.

According to an example embodiment of the disclosure, a non-transitory computer readable storage medium storing instructions, which, when executed by at least one processor of an electronic device, cause the electronic device to perform operations. The operations may comprise monitoring a plurality of messages exchanged between a user device and a configuration server. The operations may comprise detecting that a first message received from the configuration server is a failure message for completing auto-configuration. The operations may comprise obtaining a timer from a header of the failure message and a rate limiting factor of service provider from one or more databases. The operations may comprise setting an alarm in the user device, based on the obtained timer, for sending a second message to the configuration server. The operations may comprise storing configuration information in a SIM memory, wherein the configuration information includes the timer and the rate limiting factor. The operations may comprise retrieving the stored configuration information from the SIM memory in a requesting mode. The operations may comprise configuring the user device to send a third message to the configuration server based on the retrieved configuration information.

The foregoing summary is illustrative and is not intended to be in any way limiting. In addition to the illustrative aspects, embodiments, and features described earlier, further aspects, embodiments, and features will become apparent by reference to the drawings and the following detailed description.

BRIEF DESCRIPTION OF THE DRAWINGS

The same numbers are used throughout the figures to reference like features and components. Further, the above and other aspects, features and advantages of certain embodiments of the present disclosure will be more apparent from the following detailed description, taken in conjunction with the accompanying drawings, in which.

DETAILED DESCRIPTION

In the following description, various details are set forth in order to provide a thorough understanding of the present disclosure. It will be apparent, however, to one skilled in the art that these specific details are simply examples and are not intended to be limiting. Additionally, it may be noted that the systems and/or methods are shown in block diagram form to avoid obscuring the present disclosure. It is to be understood that various omissions and substitutions of equivalents may be made as circumstances may suggest or render expedient to cover various applications or implementations without departing from the spirit or the scope of the present disclosure. Further, it is to be understood that the phraseology and terminology employed herein are for the purpose of clarity of the description and should not be regarded as limiting.

Furthermore, in the present description, references to "one embodiment" or "an embodiment" may refer, for example, to a particular feature, structure, or characteristic described in connection with the embodiment being included in at least one embodiment of the present disclosure. The appearance of the phrase "in one embodiment" in various places in the disclosure is not necessarily referring to the same embodiment, nor are separate or alternative embodiments mutually exclusive of other embodiments. Further, the terms "a" and "an" used herein do not denote a limitation of quantity, but rather denote the presence of at least one of the referenced items. Moreover, various features are described which may be exhibited by various embodiments and not by others. Similarly, various requirements are described, which may be requirements for various embodiments but not for other embodiments.

Figure 1:
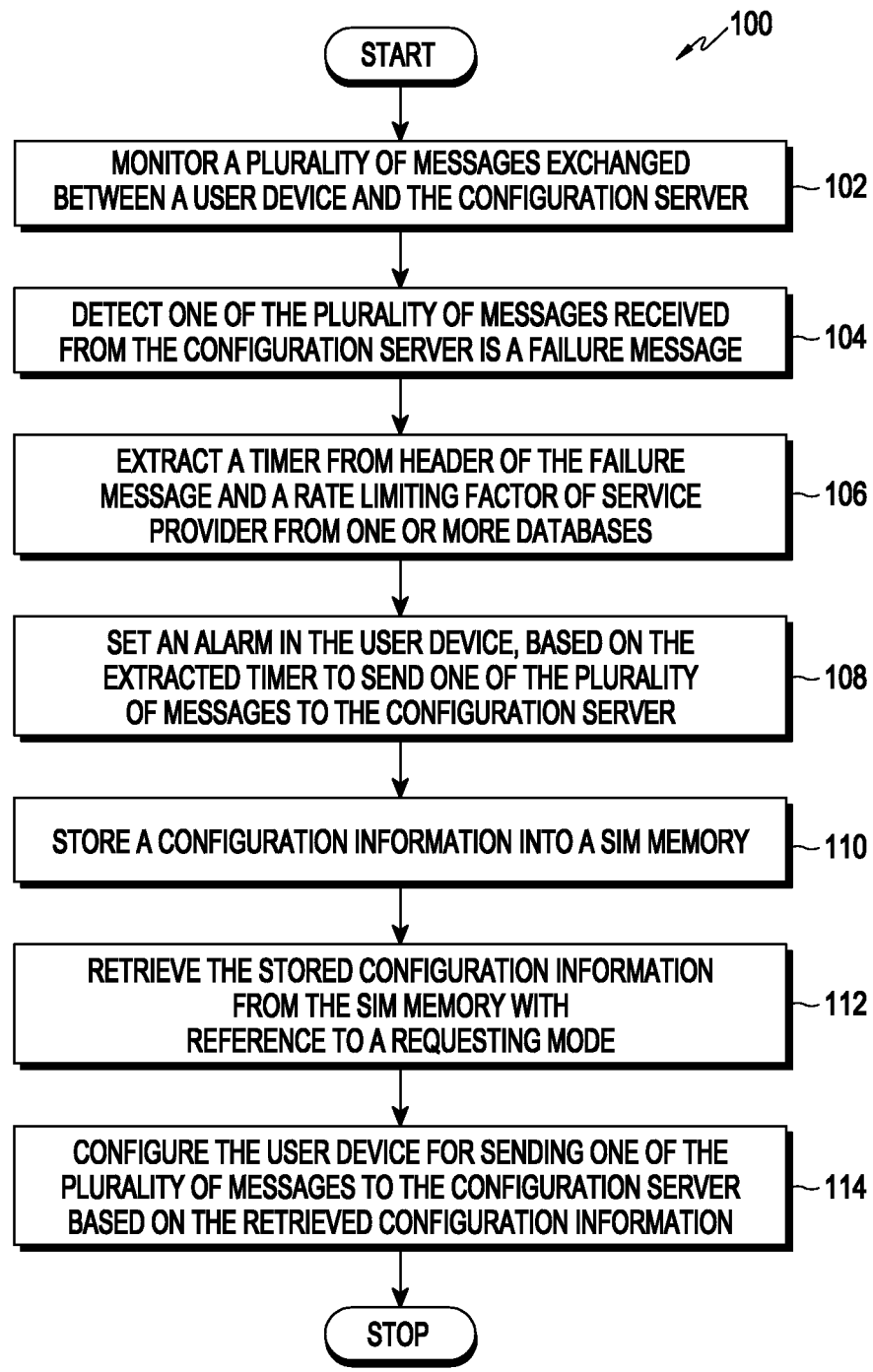
FIG. 1 is a flowchart illustrating an example method for avoiding rich communication service (RCS) auto-configuration failure and preventing/reducing subscriber identity module (SIM) black listing from a configuration server, according to various embodiments.

Referring to FIG. 1, a flowchart illustrating an example method (100) for avoiding rich communication service (RCS) auto-configuration failure and preventing/reducing subscriber identity module (SIM) black listing from a configuration server according to various embodiments is disclosed. The method (100) may use an artificial intelligence (AI) model for avoiding the RCS auto-configuration failure and preventing/reducing SIM black listing. The method (100) may be explained in conjunction with the system comprising a plurality of modules illustrated, for example, in FIG. 2. The system may be implemented in an electronic device. In an embodiment, the electronic device may be a user device or implemented in the user device. In an embodiment, the electronic device may be a device separated from the user device. At least one of the plurality of modules may be implemented through an AI model. A function associated with AI may be performed through the non-volatile memory, the volatile memory, and the processor in the electronic device.

The processor may include one or a plurality of processors. The one or a plurality of processors may include a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined (e.g., specified) operating rule or artificial intelligence (AI) model stored in the non-volatile memory and the volatile memory. The predefined operating rule or artificial intelligence model is provided through training or learning. Being provided through learning may refer, for example, to, by applying a learning algorithm to a plurality of learning data, a predefined operating rule or AI model of a desired characteristic being made. The learning may be performed in a device itself in which AI according to an embodiment is performed, and/or may be implemented through a separate server/system. The artificial intelligence model may include a plurality of neural network layers. Each of the plurality of neural network layers includes a plurality of weight values and performs neural network computation by computation between a result of computation by a previous layer and the plurality of weight values. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may refer, for example, to a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In the flowchart of FIG. 1, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 1 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

A plurality of messages exchanged between a user device and the configuration server is monitored, at 102. In an embodiment, the plurality of messages includes request messages and response messages, the request messages are HTTP or HTTPS request messages sent from the user device to the configuration server, and the response messages are HTTP or HTTPS response messages from the configuration server to the user device. In an embodiment, the user device may be an electronic device which include at least but not limited to a mobile phone, a computer, a PDA, a laptop, an electronic wearable device, any computing device and handheld electronic device capable of operating a software application. One of the plurality of messages received from the configuration server may be detected as a failure message, at 104. In an embodiment, the one of the plurality of messages received from the configuration server is for completing auto-configuration.

A timer from header of the failure message and rate limiting factor of service provider from one or more databases are extracted, at 106. An alarm is set, at 108, in the user device to send one of the plurality of messages to the configuration server. In an embodiment, the alarm is set based on the extracted timer. The configuration information is stored, at 110, into a SIM memory. In an embodiment, the configuration information includes the timer and count of the rate limiting factor the user device. The stored configuration information is retrieved, at 112, from the SIM memory with reference to a requesting mode. One of the plurality of messages is sent, at 114, to the configuration server based on the retrieved configuration information for configuring the user device.

Figure 2:
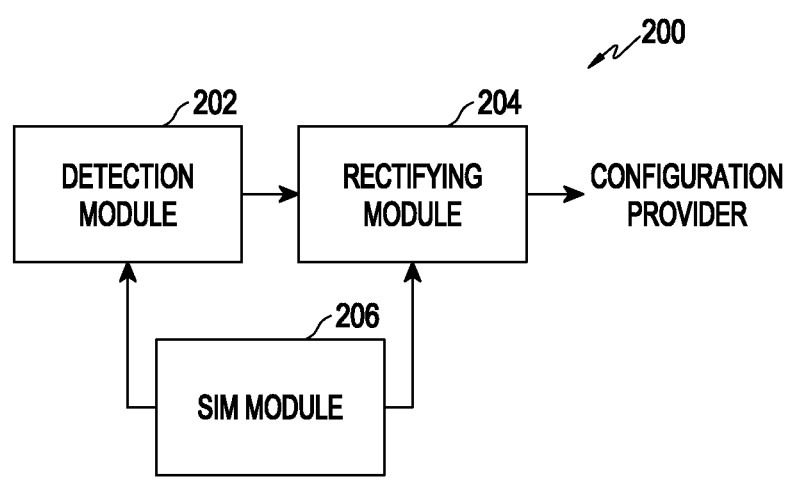
FIG. 2 is a block diagram illustrating an example configuration of a system for avoiding the RCS auto-configuration failure and preventing/reducing SIM black listing from the configuration server, according to various embodiments.

Referring to FIG. 2 a block diagram illustrating an example configuration of a system (200) for avoiding the RCS auto-configuration failure and preventing/reducing the SIM black listing from the configuration server according to various embodiments. The system (200) comprises a detection module (e.g., including various processing circuitry and/or executable program instructions) (202) configured for performing a plurality of functions including monitoring a plurality of messages exchanged between a user device and the configuration server. In an embodiment, the plurality of messages includes request messages and response messages, the request messages are HTTP or HTTPS request messages sent from the user device to the auto configuration server and the response messages are HTTP or HTTPS response messages from the auto configuration server to the user device. The plurality of functions further including detecting one of the plurality of messages received from the configuration server is a failure message. In an embodiment, the failure message is a HTTP or HTTPS response. The plurality of functions further including extracting a timer from header of the failure message and rate limiting factor of service provider from one or more databases. The detection module (202) is described in greater detail below with reference to FIG. 3. Each of the modules illustrated herein may include various processing circuitry and/or executable program instructions.

Figure 3:
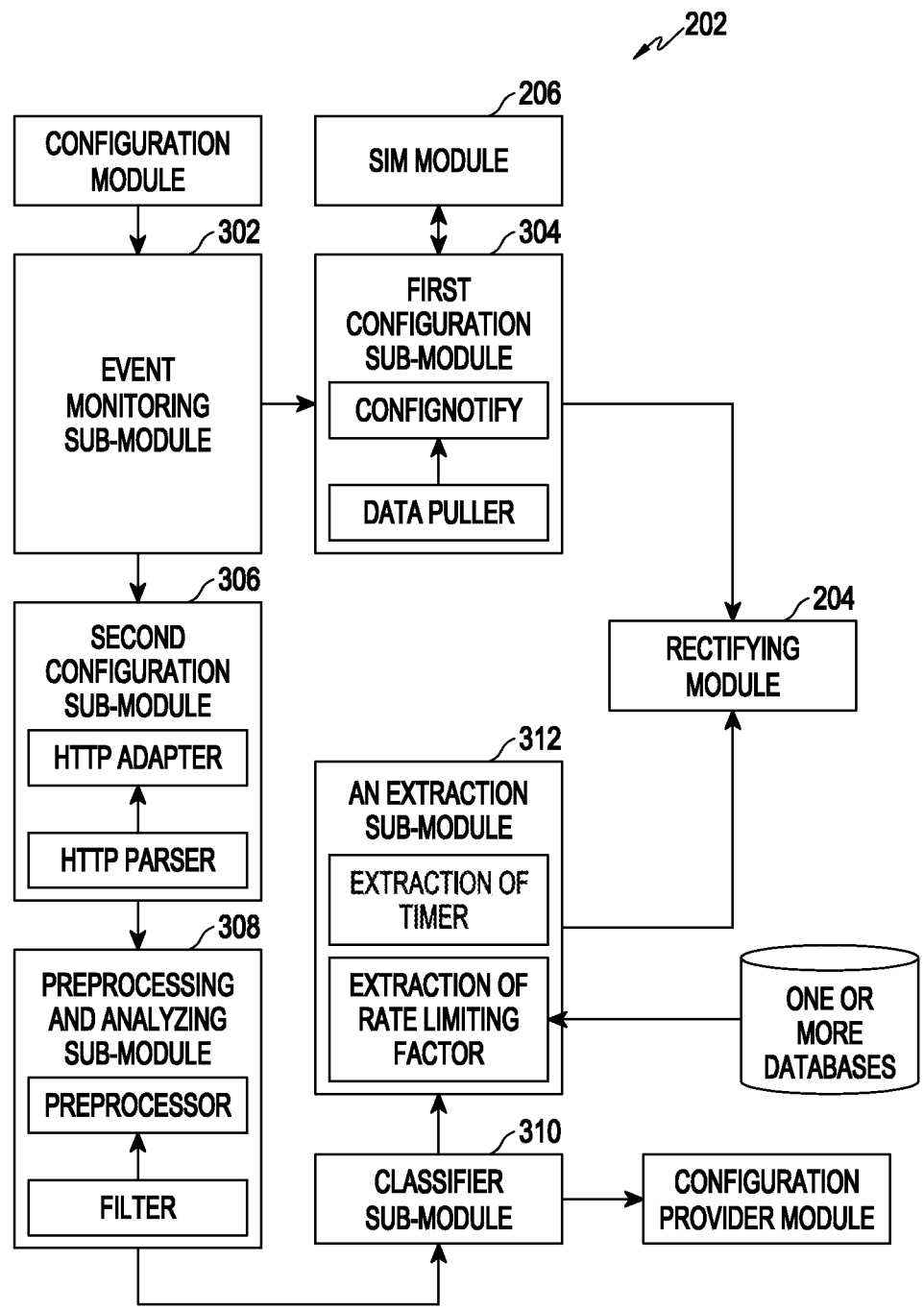
FIG. 3 is a block diagram illustrating an example configuration of a detection module, according to various embodiments.

FIG. 3 is a block diagram illustrating an example configuration of the detection module (202) according to various embodiments. As illustrated, the detection module (202) comprises an event monitoring sub-module (302). The event monitoring sub-module (302) is configured for monitoring the plurality of messages exchanged between the user device and the configuration server. In an embodiment, the event monitoring sub-module (302) monitors the plurality of messages received from a configuration module. The detection module (202) further comprises a first configuration sub-module (304). The first configuration sub-module (304) is configured for receiving the plurality of messages from the configuration server for starting auto-configuration. In an example embodiment, the first configuration sub-module (304) is configured for receiving the plurality of messages from the configuration module. The first configuration sub-module (304) is further configured for retrieving retrial attempt parameter from the SIM memory through the SIM module (206) with reference to a requesting mode, and sending to the rectifying module (204). In an embodiment, the requesting mode includes one of a primary device, a secondary device and a changed device. It should be noted that the primary device is the user device and the secondary device like gears, smartwatches etc. is connected to the primary device using convergence technologies including at least Bluetooth and WiFi technology. The first configuration sub-module (304) comprises a data puller for receiving the timer and count of the rate limiting factor from the SIM memory and a confignotify for sending the received timer and count of the rate limiting factor to the rectifying module (204). It should be noted that the first configuration sub-module (304) activates only when the plurality of messages is for starting the auto-configuration.

The detection module (202) further comprises a second configuration sub-module (306). The second configuration sub-module (306) is configured for receiving the plurality of messages from the configuration server for completing auto-configuration through the event monitoring sub-module (302) and parsing each of the plurality of messages. In an example embodiment, the second configuration sub-module (306) is configured for receiving the plurality of messages from the configuration module. In an embodiment, the second configuration sub-module (306) comprises a HTTP adapter for receiving the plurality of messages for completing auto-configuration from a configuration service module through the event monitoring sub-module (302) and a HTTP parser for parsing each of the plurality of messages.

The detection module (202) further comprises a preprocessing and analyzing sub-module (308). The preprocessing and analyzing sub-module (308) is configured for processing and analyzing each of the parsed plurality of messages for RCS failure event. In an embodiment, preprocessing and analyzing sub-module (308) comprises a preprocessor for processing each of the plurality of messages received from the HTTP parser of the second configuration sub-module (306) and a filter for filtering the plurality of messages disclosing the RCS failure event. The detection module (202) further comprises a classifier sub-module (310). The classifier sub-module (310) is configured for determining the RCS failure event is the failure message which is a HTTP OR HTTPS response and send to an extraction sub-module (312). In an example embodiment, the RCS failure event is a HTTPS 503 server unavailable message.

The extraction sub-module (312) is configured for extracting the timer from header of the failure message and rate limiting factor of service provider from one or more databases and sending the extracted timer and the rate limiting factor to the rectifying module (204). In an embodiment, the timer is a retry after timer provided by the configuration server for sending one of the plurality of messages to the configuration server for RCS auto-configuration. The one or more databases include a service provider database and the rate limiting factor includes limit of retrial provided by the service provider.

The system (200) further comprises a rectifying module (204) communicatively coupled to the detection module (202). The rectifying module (204) is configured for setting an alarm in the user device based on the extracted timer and configuring the user device for sending one of the plurality of messages to the configuration server based on retrieved configuration information. The rectifying module (204) is described in greater detail below with reference to FIG. 4.

Figure 4:
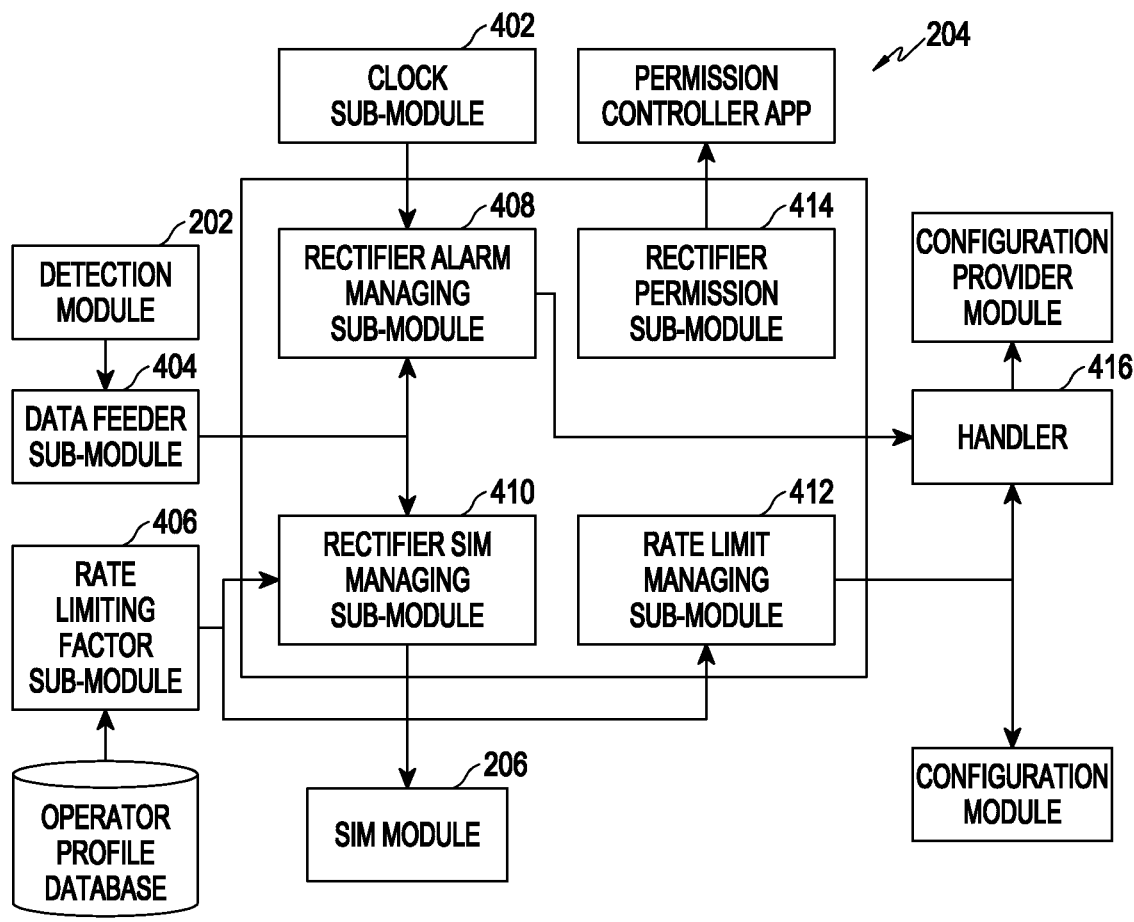
FIG. 4 is a block diagram illustrating an example configuration of a rectifying module, according to various embodiments.

FIG. 4 is a block diagram illustrating an example configuration of the rectifying module (204) according to various embodiments. As illustrated, the rectifying module (204) comprises a clock sub-module (402). The clock sub-module (402) is configured for providing an accurate time to a rectifier alarm managing sub-module (408). The rectifying module (204) further comprises a data feeder sub-module (404), configured for receiving the timer from the detection module (202) and feeding to the rectifier alarm managing sub-module (408) and a rectifier SIM managing sub-module (410). The rectifying module (204) further comprises a rate limiting factor sub-module (406), configured for receiving count of the rate limiting factor from an operator profile database and providing to the rectifier SIM managing sub-module (410) and a rate limit managing sub-module (412). In an embodiment, the operator profile database includes count of the rate limiting factor for the SIM.

The rectifying module (204) further comprises the rectifier alarm managing sub-module (408) configured for receiving the accurate time from the clock sub-module (402) and setting the alarm in the user device based on the timer received from the data feeder sub-module (404). The rectifying module (204) further comprises the rectifier SIM managing sub-module (410), configured for receiving the timer from the data feeder sub-module (404) and rate limiting factor from the rate limiting factor sub-module (406) and sending the time and count of the rate limiting factor to the SIM module (206). The rectifying module (204) further comprises the rate limit managing sub-module (412), configured for receiving count of the rate limiting factor from the rate limiting factor sub-module (406) and setting the rate limiting count into the configuration module to restrict sending one of the plurality of messages to the configuration server.

The rectifying module (204) further comprises a rectifier permission managing sub-module (414), configured for communicating with permission controller app for accessing the SIM. The rectifying module (204) further comprises a handler (416), configured for receiving input from the rectifier alarm managing sub-module (408) and the rate limit managing sub-module (412) and determining sending one of the plurality of messages to a configuration provider module. It should be noted that the handler (416) restricts sending of one of the plurality of messages to the configuration server when the count of the rate limiting factor exceeds the limit of retrial extracted from the service provider database.

The system (200) further comprises a SIM module (206) communicatively coupled to the detection module (202) and the rectifying module (204). The SIM module (206) is configured for storing configuration information into the SIM memory. In an embodiment, the configuration information includes the timer and the rate limiting factor. The SIM module (206) is further configured for storing a count of the configuration information in the SIM memory. The SIM module (206) is described in greater detail below with reference to FIG. 5.

Figure 5:
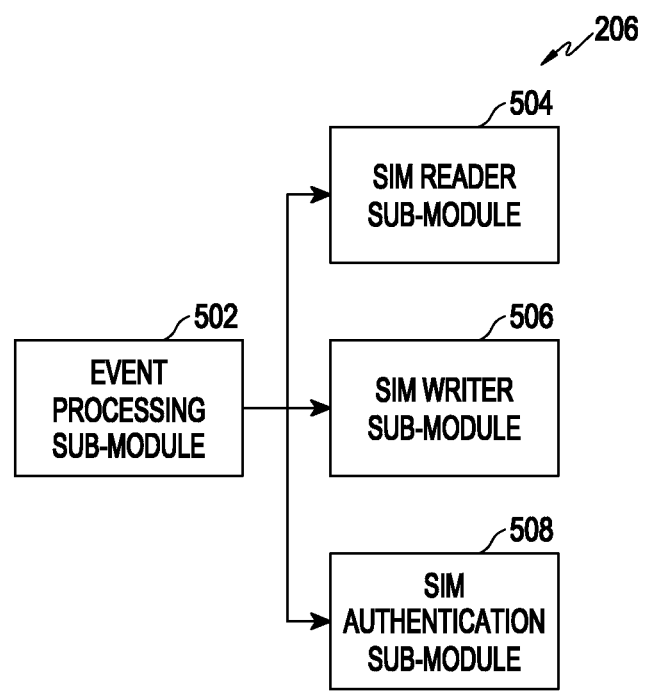
FIG. 5 is a block diagram illustrating an example configuration of a SIM module, according to various embodiments.

FIG. 5 is a block diagram illustrating an example configuration of a SIM module (206) according to various embodiments. The SIM module (206) comprises an event processing sub-module (502), configured for redirecting requests received from the detection module (202) and the rectifying module (204) to a SIM reader sub-module (504) or to a SIM writer sub-module (506). In an example embodiment, the event processing sub-module (502), configured for redirecting the request from the detection module (202) to the SIM reader sub-module (504) and the rectifying module (204) to the SIM writer sub-module (506).

The SIM module (206) further comprises the SIM reader sub-module (504), configured for sending a SIM reader command and uses a SIM application toolkit for tracking timer and the rate limit factor associated with international mobile subscriber identity (IMSI) of the SIM. In an embodiment, the SIM reader sub-module (504), configured for sending a SIM reader command on receiving a request from the first configuration sub-module (304) of the detection module (202). The sim application toolkit includes a set of commands to define method of interaction of the SIM with outside world and extends communication protocol between the SIM and the user device.

The SIM module (206) further comprises the SIM writer sub-module (506), configured for sending a SIM writing command to feed timer and the rate limiting factor into the IMSI of the SIM. The SIM module (206) further comprises a SIM authentication sub-module (508) configured for performing authentication of the plurality of messages received from the user device.

The SIM module (206) is further configured to communicate with a SIM manager to provide an access of information about the SIM services and states on Integrated Circuit Card (ICC). In an embodiment, the SIM manager communicates with a radio interface layer (RIL). The RIL is a layer in an operating system which provides an interface to the services and modem. The modem is communicatively coupled to an application protocol data unit (APDU). The APDU is a transmission protocol to transfer data between the user device and the SIM, and can be a command APDU or a response APDU.

Figure 6:
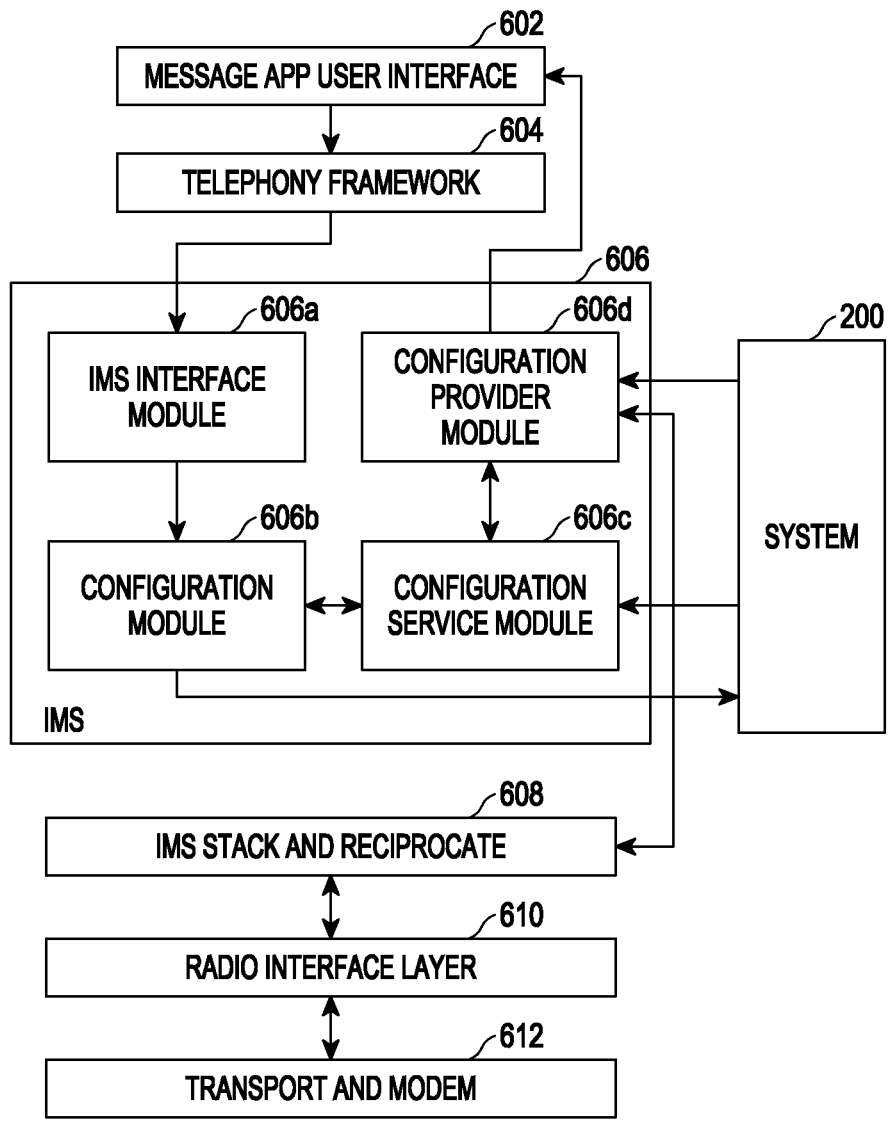
FIG. 6 is a block diagram illustrating an example configuration of a new RCS architecture, according to various embodiments.

FIG. 6 is a block diagram illustrating an example configuration of a new RCS architecture (600) according to various embodiments. The RCS architecture (600) discloses a flow of RCS auto-configuration and utilization of the system (200) for avoiding the RCS auto-configuration failure and preventing/reducing the SIM black listing from the configuration server. The message app user interface (UI) (602) of the user device is configured of enable the user to enter a messaging app and enable an option for activating the rich communication service (RCS). The telephony framework (604) sends request to start configuration to IMS (606). In an embodiment, the IMS (606) includes IMS interface module (606a), configuration module (606b), configuration service module (606c), and configuration provider module (606d). The IMS interface module (606a) is configured to interact with all the IMS modules including Volte, SMS and RCS and send request of start configuration to the configuration module (606b). It should be noted that the configuration module (606b) supports starting and completion of the RCS auto-configuration and notifies to the IMS interface module (606a) on completion of the RCS auto-configuration.

The configuration service module (606c) is communicatively coupled to the configuration module (606b) and configured to support all internal interfaces and adapters such as WorkFlow, HTTPAdapter, TelephonyAdapter, XML parser adapter, storage adapter. In an embodiment, the HTTPAdpater is responsible to create HTTP request and send to the HTTP adapter of the detection module (202). The WorkFlow module is configured to run operator specific module and send associated HTTP request to the IMS interface module (606a).

The configuration provider module (606d) is communicatively coupled to the configuration service module (606c) and configured to provide a parsed configuration information to applications like version, response code etc. The configuration provider module (606d) further communicatively coupled to the IMS stack and reciprocate (608). The IMS stack and reciprocate (608) is configured to process the incoming request from IMS interface module and sends to the Transport and model (612) through a radio interface layer (RIL) (610). The RIL is a layer in an operating system which provides an interface to the services and modem.

Figure 7A:
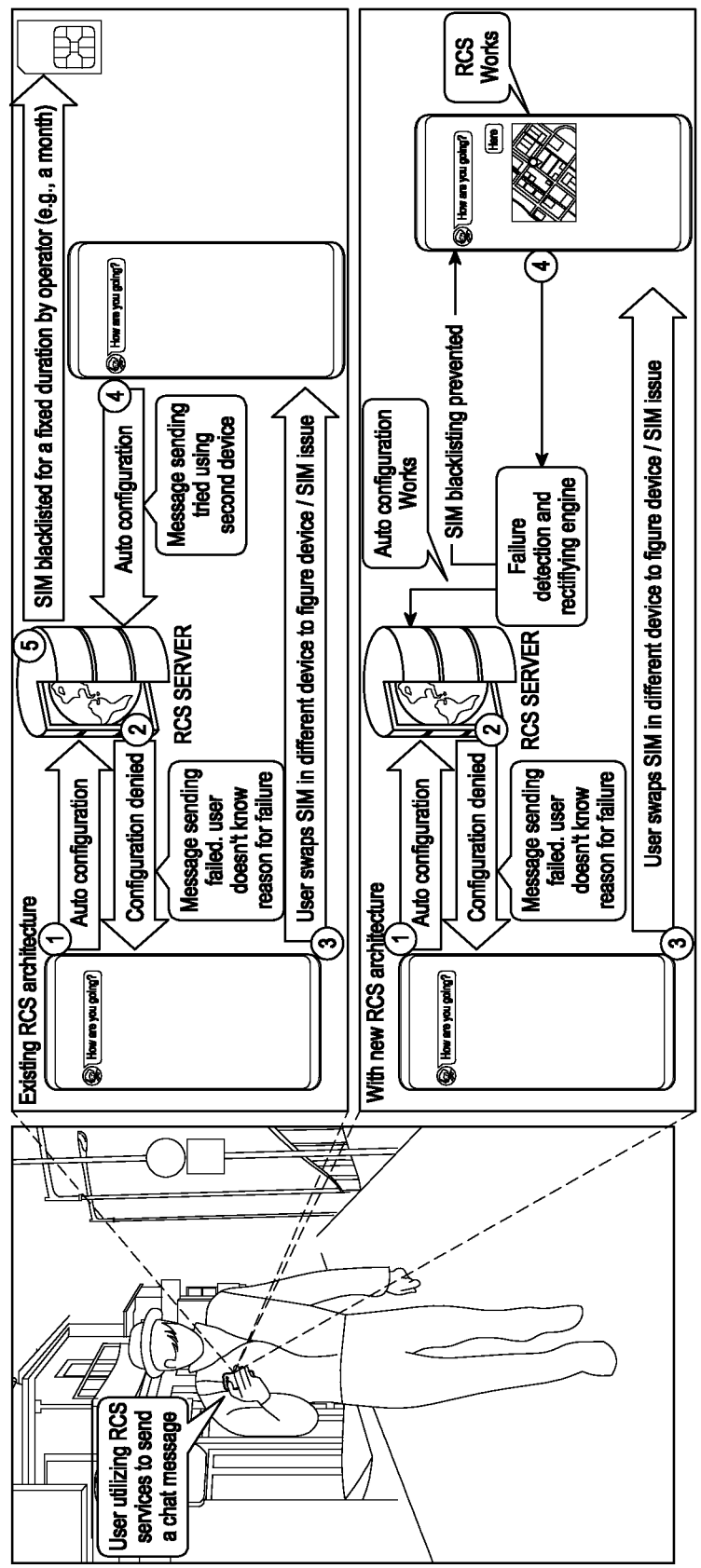
FIG. 7A is a diagram illustrating a first use example of sending request of the RCS auto-configuration from a changed device by utilizing the existing and the new RCS architecture, according to various embodiments.

The system (200) is communicatively coupled to the configuration module (606b), the configuration service module (606c), and the configuration provider module (606d) to avoid the RCS auto-configuration failure and prevent/reduce the SIM black listing from the configuration server FIG. 7A is a diagram illustrating a first use example of sending request of the RCS auto-configuration from a changed device by utilizing the existing and the new RCS architecture according to various embodiments.

As illustrated, the user is utilising the RCS services to send a chat message. In case of existing architecture of the RCS, the user device sends the RCS auto-configuration request (1) to the RCS server and receives a failure message (2) from the RCS server without the reason of failure. The user then changes the device (3) to determine if the RCS failure is due to the device or the SIM and sends the RCS auto-configuration request (4) from the same SIM using the changed device to the RCS server again. On receiving the request, the SIM gets blacklisted (5) by the operator for one months duration.

In case of the new RCS architecture, the user device sends the RCS auto-configuration request (1) to the RCS server and receives a failure message (2) from the RCS server without knowing the reason for the failure. The user then changes the device (3) to determine if the RCS failure is due to the device or the SIM. The system, as per the new RCS architecture, then determines the retry after timer and count of the limiting factor for the SIM and accordingly sends the auto-configuration request to the RCS server from the changed device on the retry after timer provided by the RCS server. On receiving the request at the retry after timer, the RCS server configures the RCS services on the user device.

Figure 7B:
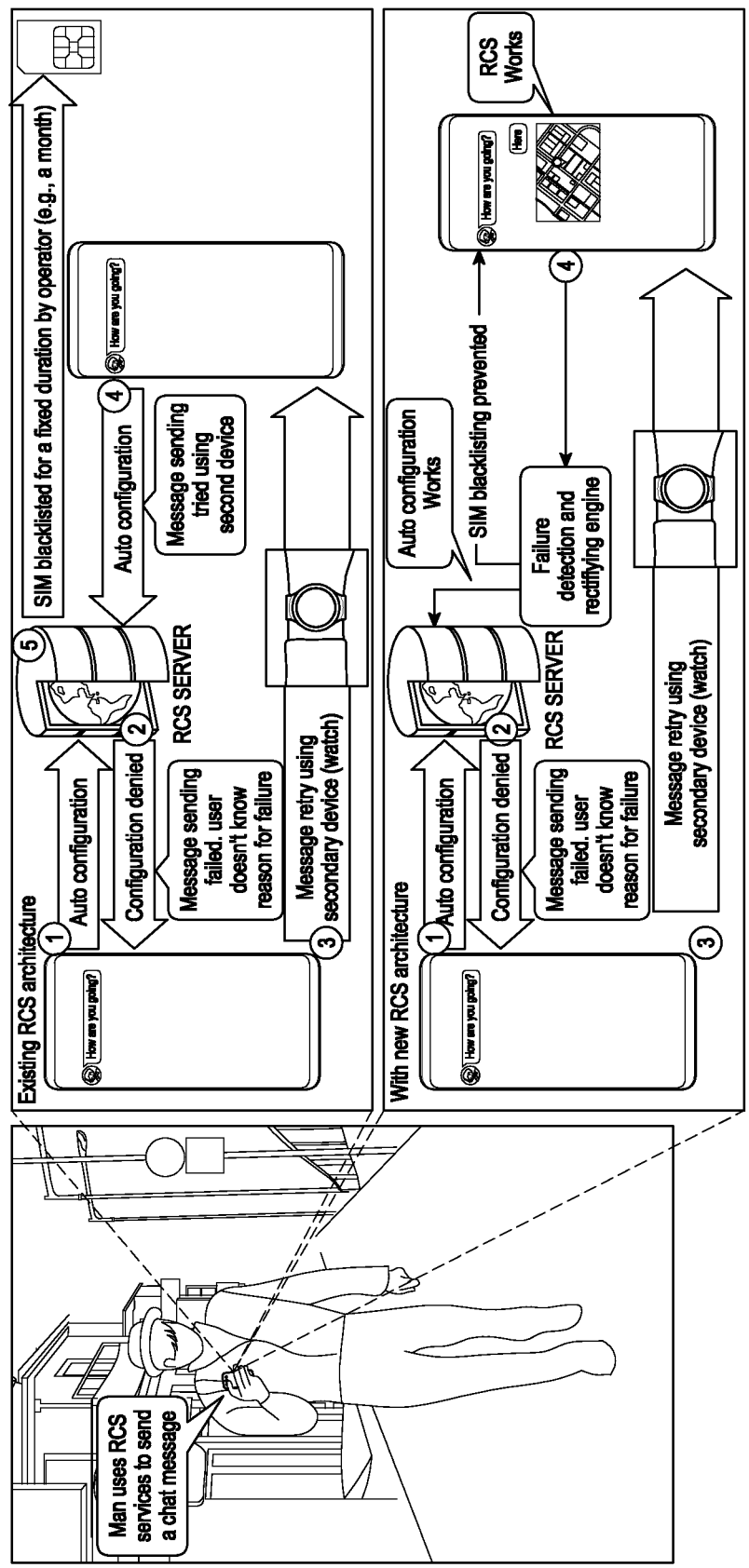
FIG. 7B is a diagram illustrating a second use example of sending request of the RCS auto-configuration from a secondary device by utilizing the existing and the new RCS architecture, according to various embodiments.

FIG. 7B is a diagram illustrating a second use example of sending request of the RCS auto-configuration from a secondary device by utilizing the existing and the new RCS architecture according to various embodiments.

As illustrated, the user is utilising the RCS services to send a chat message. In case of existing architecture of the RCS, the user device sends the RCS auto-configuration request (1) to the RCS server and receives a failure message (2) from the RCS server without the reason of failure. The user then retries sending message (3) using watch (the secondary device) and sends the RCS auto-configuration request (4) from the same SIM to the RCS server again. On receiving the request, the SIM gets blacklisted (5) by the operator for one month's duration.

In case of the new RCS architecture, the user device sends the RCS auto-configuration request (1) to the RCS server and receives a failure message (2) from the RCS server without knowing the reason for the failure. The user then retries sending message (3) using watch (the secondary device) and sends the RCS auto-configuration request (4) from the same SIM at a determined retrial timer based on count of the limiting factor for the SIM. On receiving the request at the retrial timer, the RCS server configures the RCS services on the user device.

It has shown that the system and method for avoiding rich communication service (RCS) auto-configuration failure and preventing/reducing subscriber identity module (SIM) black listing from a configuration server according to the disclosure achieves the purposes highlighted earlier. Such a system and method can in any case undergo numerous modifications and variants, all of which are covered by the disclosure, moreover, the details can be replaced by technically equivalent elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for supporting, by a user device, rich communication service (RCS) auto-configuration, the method comprising:
   sending, from a subscriber identity module (SIM), a first request message for RCS auto-configuration to a configuration server;
   receiving a failure message for the RCS auto-configuration from the configuration server;
   obtaining a timer from a header of the failure message and a rate limiting factor of service provider from one or more databases;
   storing the timer and the rate limiting factor in a memory of the SIM,
   wherein the timer and the rate limiting factor stored in the memory of the SIM is used for restricting transmission of a second request message for the RCS auto-configuration from the SIM to the configuration server in case that the SIM is installed on another device different from the user device; and
   restricting sending of a message to the configuration server based on a count of the rate limiting factor exceeding a limit of retrial obtained from the one or more databases.

2. The method of claim 1, wherein the first request message and the second request message include HTTP or HTTPS request messages.

3. The method of claim 1, wherein the failure message includes an HTTP or HTTPS response message.

4. The method of claim 1, further comprising retrieving a retrial attempt parameter including the timer and count of the rate limiting factor from the memory of the SIM in a requesting mode, and sending the parameter.

5. The method of claim 4, wherein the requesting mode includes one of a primary device, a secondary device, and a changed device.

6. The method of claim 1, wherein the count of the rate limiting factor is stored in the memory of the SIM.

7. The method of claim 1, wherein the timer includes a retry after timer provided by the configuration server, the one or more databases include a service provider database, and the rate limiting factor includes limit of retrial provided by the service provider.

8. A user device for supporting rich communication service (RCS) auto-configuration, the user device comprising:
   memory storing instructions; and
   at least one processor, wherein the instructions, when executed by the at least one processor, cause the user device to perform operations, wherein the operations comprise:
   sending, from a subscriber identity module (SIM), a first request message for RCS auto-configuration to a configuration server,
   receiving a failure message for the RCS auto-configuration from the configuration server,
   obtaining a timer from a header of the failure message and a rate limiting factor of service provider from one or more databases,
   storing the timer and the rate limiting factor in a memory of the SIM,
   wherein the timer and the rate limiting factor stored in the memory of the SIM is used for restricting transmission of a second request message for the RCS auto-configuration from the SIM to the configuration server in case that the SIM is installed on another device different from the user device, and
   restricting sending of a message to the configuration server based on a count of the rate limiting factor exceeding a limit of retrial obtained from the one or more databases.

9. The user device of claim 8, wherein the first request message and the second request message s include HTTP or HTTPS request messages.

10. The user device of claim 8, wherein the operations further comprise retrieving a retrial attempt parameter including the timer and count of the rate limiting factor from the memory of the SIM in a requesting mode, and sending the parameter.

11. The user device of claim 10, wherein the requesting mode includes one of a primary device, a secondary device, and a changed device.

12. The user device of claim 8, wherein the count of the rate limiting factor is stored in the memory of the SIM.

13. The user device of claim 8, wherein the timer includes a retry after timer provided by the configuration server, the one or more databases include a service provider database, and the rate limiting factor includes limit of retrial provided by the service provider.

14. A non-transitory computer readable storage medium storing instructions, which, when executed by at least one processor of a user device, cause the user device to perform operations comprising:

sending, from a subscriber identity module (SIM), a first request message for RCS auto-configuration to a configuration server;

receiving a failure message for the RCS auto-configuration from the configuration server;

obtaining a timer from a header of the failure message and a rate limiting factor of service provider from one or more databases;

storing the timer and the rate limiting factor in a memory of the SIM, wherein the timer and the rate limiting factor stored in the memory of the SIM is used for restricting transmission of a second request message for the RCS auto-configuration from the SIM to the configuration server in case that the SIM is installed on another device different from the user device; and restricting sending of a message to the configuration server based on a count of the rate limiting factor exceeding a limit of retrial obtained from the one or more databases.

* * * * *